United States Patent [19]

Gunderson et al.

[11] Patent Number: 4,677,572
[45] Date of Patent: Jun. 30, 1987

[54] PEN TURRET CONTROL SYSTEM

[75] Inventors: Charles Gunderson, Buena Park; Aftab H. Kapadya, Brea, both of Calif.

[73] Assignee: Sanders Associates, Inc., South Nashua, N.H.

[21] Appl. No.: 633,170

[22] Filed: Jul. 23, 1984

[51] Int. Cl.⁴ .................... G01D 15/28; G05B 19/12
[52] U.S. Cl. ................................ 364/520; 346/139 R; 346/49
[58] Field of Search ............... 364/520; 346/139 R, 346/141, 46, 139 C; 235/375, 462

[56] References Cited

U.S. PATENT DOCUMENTS

| | | | |
|---|---|---|---|
| 3,401,401 | 9/1968 | Read et al. | 346/140 |
| 4,135,245 | 1/1979 | Kemplin et al. | 364/520 |
| 4,157,552 | 6/1979 | Nakajima | 346/141 |
| 4,401,996 | 8/1983 | Shirahata | 364/520 |
| 4,405,931 | 9/1983 | Fujisawa | 346/139 R |
| 4,417,258 | 11/1983 | Tribolet et al. | 346/139 R |
| 4,441,109 | 4/1984 | Fujisawa | 346/139 R |
| 4,488,159 | 12/1984 | Fujiwara et al. | 346/139 R |
| 4,496,958 | 1/1985 | Brandt et al. | 346/139 R |
| 4,503,441 | 3/1985 | Tamukai | 346/139 R |
| 4,533,823 | 8/1985 | Vittorio | 235/375 |
| 4,540,993 | 9/1985 | Gunderson et al. | 346/139 R |
| 4,567,565 | 1/1986 | Haselby et al. | 346/520 |

Primary Examiner—Parshotam S. Lall
Assistant Examiner—Thomas G. Black
Attorney, Agent, or Firm—William F. Porter, Jr.

[57] ABSTRACT

A control system for controlling a turret head in a pen plotter wherein the turret head and pen holder move in combination with the pen carriage to provide turret selectability at the writing site. Sensors and associated logic are provided for detecting the presence of a turret on the pen carriage, for sensing the presence and absence of pens in the turret and in the pen holder, for detecting the type of pen or other writing device being used and taking appropriate action responsive thereto, and for applying varible damping constants to the movement of the turret head. Control logic is disclosed for assuring reliable and optimum operation.

7 Claims, 24 Drawing Figures

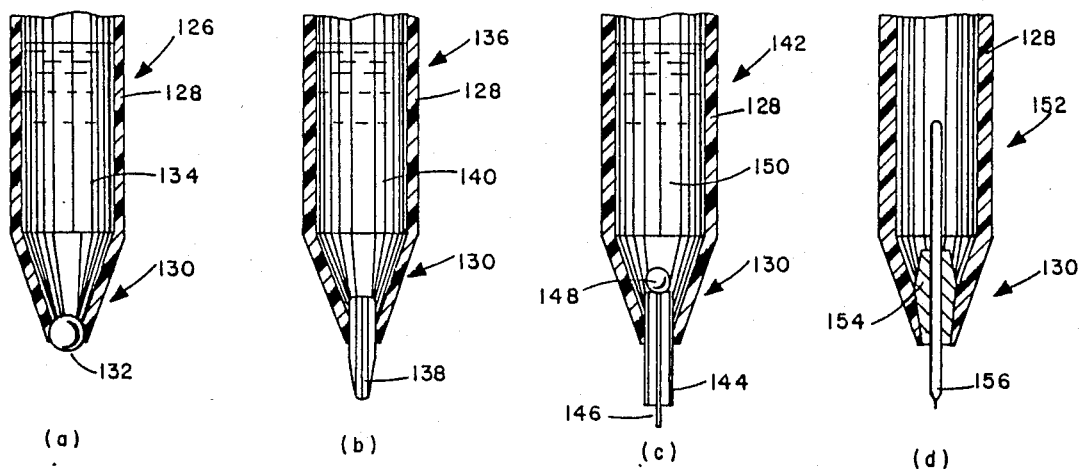
FIG. 10
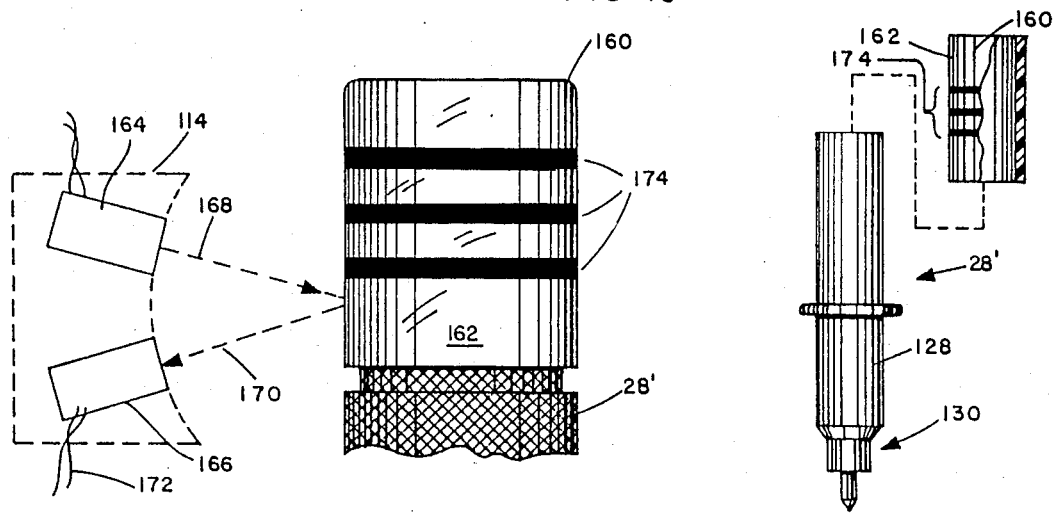
FIG. 11
FIG. 12
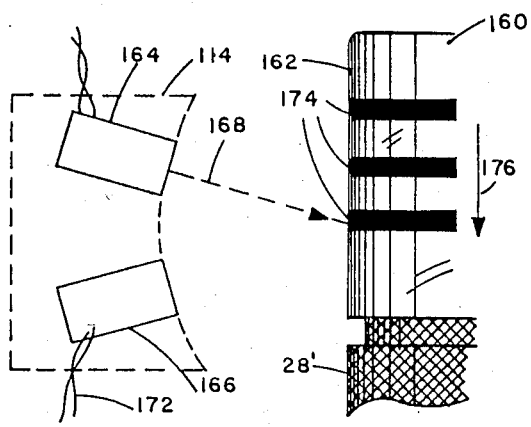
FIG. 13
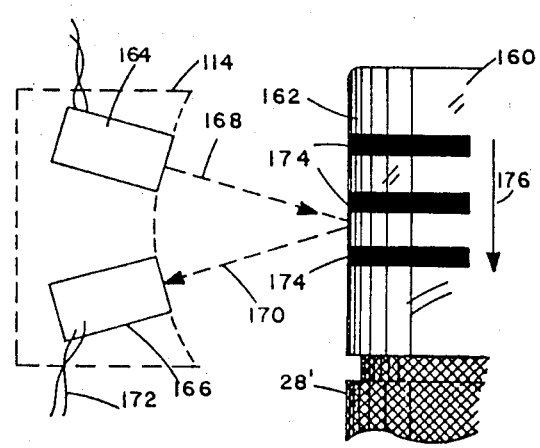
FIG. 14

PEN TURRET CONTROL SYSTEM

BACKGROUND OF THE INVENTION

In co-pending application, Ser. No. 633,174 now U.S. Pat. No. 4,518,972, filed on even date herewith and titled "Graphics Plotter Turret Head" by co-inventor Charles Gunderson of this application and assigned to the common assignee of this application, there is disclosed a turret head for a graphics plotter wherein the turret head and an associated pen holder move with the pen carriage to provide exchangeability of eight pens adjacent the writing site. To assure failsafe, reliable and optimum operation of that turret head and the associated plotter, a control system and associated devices was necessary. Since the turret head described therein is of novel construction, no such associated control system and apparatus existed in the art for use in conjunction therewith. The present invention, therefore, relates to a control system and associated devices for use in conjunction with the aforementioned graphics plotter turret head as incorporated into a commercial graphics plotter by the common assignee of the two applications.

SUMMARY

The present invention is intended for incorporation in a graphics plotter having a turret for releasably holding a plurality of writing devices and a pen holder for exchangeably obtaining writing devices from the turret where the turret and holder are moved in combination on a pen carriage, the turret is rotated by a logic controlled stepping motor, the pen holder is raised and lowered by a logic controlled linear electromagnetic coil, and the pen carriage is moved by a logic controlled drive motor, and comprises, in general, first sensor means for detecting the presence and absence of a turret on the pen carriage and for producing a signal indicating same; second sensor means for detecting when the turret is in a home position and for producing a signal indicating same; third sensor means for detecting the degree of proximity of the pen holder to raised and lowered positions and for producing a signal indicating same; fourth sensor means for detecting the presence or absence of writing means at addressable positions of the turret relative to the home position, for detecting the presence or absence of writing means in the pen holder, for determining the type of writing device in the pen holder, and for producing signals indicating same; a variable current source connected between the logic and the electromagnetic coil for controlling the position of the pen holder and the downward pressure on a writing device in the holder; and additional logic for assuring that the turret is in place, for counting the number and types of pens being employed, for assuring that a proper pen exchange has taken place when attempted, for providing an optimum pressure on the pen when writing and for moving the pen carriage using a variable damping factor based on the total weight of the pen carriage and turret.

DESCRIPTION OF THE DRAWINGS

FIGS. 10a–10d show a simplified cutaway elevation through various types of writing devices as employed with the present invention.

FIG. 11 shows the manner of detecting pen presence and type according to the present invention.

FIG. 12 is a partially cutaway view of a pen according to the present invention in an embodiment wherein a removeable collar is employed to carry the sensing surface.

FIGS. 13 and 14 show the manner in which pen type is detected by the sensor and pen of FIG. 11 according to the present invention.

DESCRIPTION OF THE PREFERRED EMBODIMENTS

Figure 1:
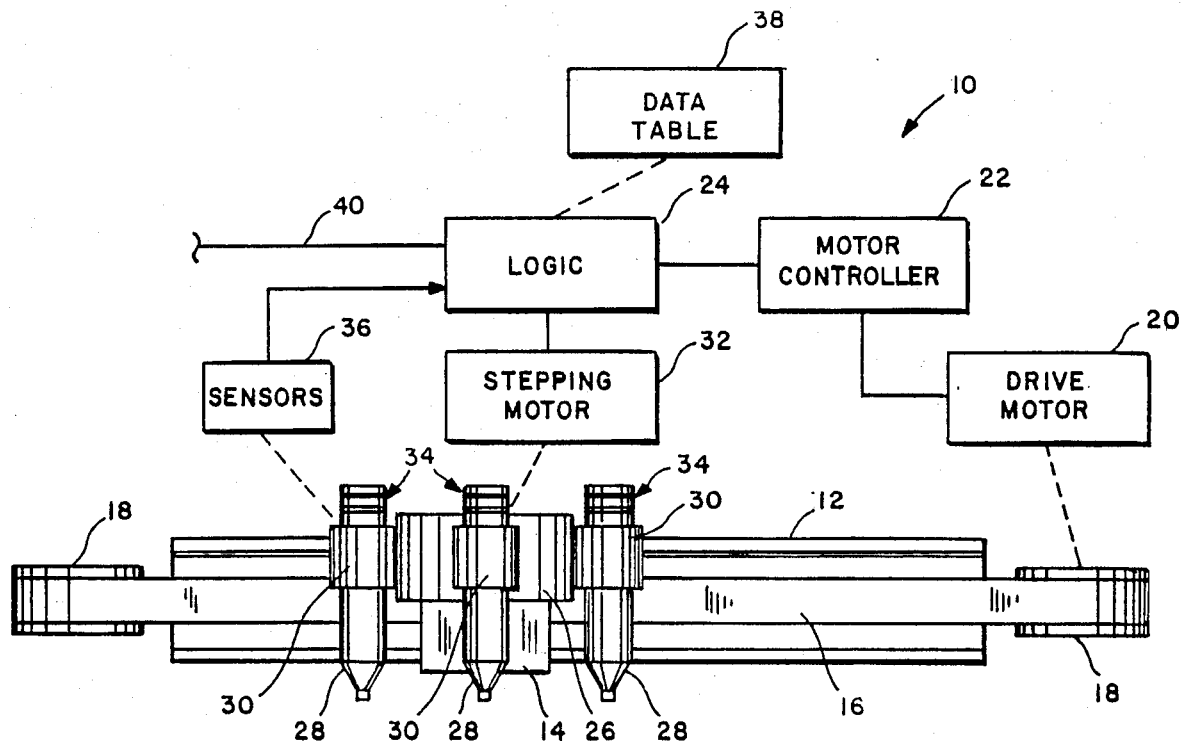
FIG. 1 is a combined simplified elevation of a pen turret and associated block diagram of the control system of the present invention.

Turning first to FIG. 1, the critical portions of a graphics plotter, generally indicated as 10, relative to the present invention are shown in simplified and block diagram form. Plotter 10 includes a track 12 disposed above a writing medium (not shown) having a pen carriage 14 slideably mounted thereon. Pen carriage 14 is connected to a metal tape 16 which passes around pulleys 18 which, in turn, can be driven by drive motor 20 under the control of motor controller 22 in response to directives from logic 24. As the pulleys 18 are rotated by drive motor 20, the pen carriage 14 is moved back and forth along the track 12. Pen carriage 14 has included thereon a rotating turret 26 carrying a plurality of pens 28 in releasable gripping means 30. The turret 26 can be rotated by stepping motor 32 as directed by logic 24. The pens 28 contain readable indicia at 34 and sensors 36 are provided to provide logic 24 with information about the turret and its contents. A data table 38 is provided for the use of logic 24 and additional information to logic 24 or changes to the data table 38 (such as, for example, pen type codes, writing medium being used, pen weights by type, and damping constants) are implemented over line 40.

Figure 2:
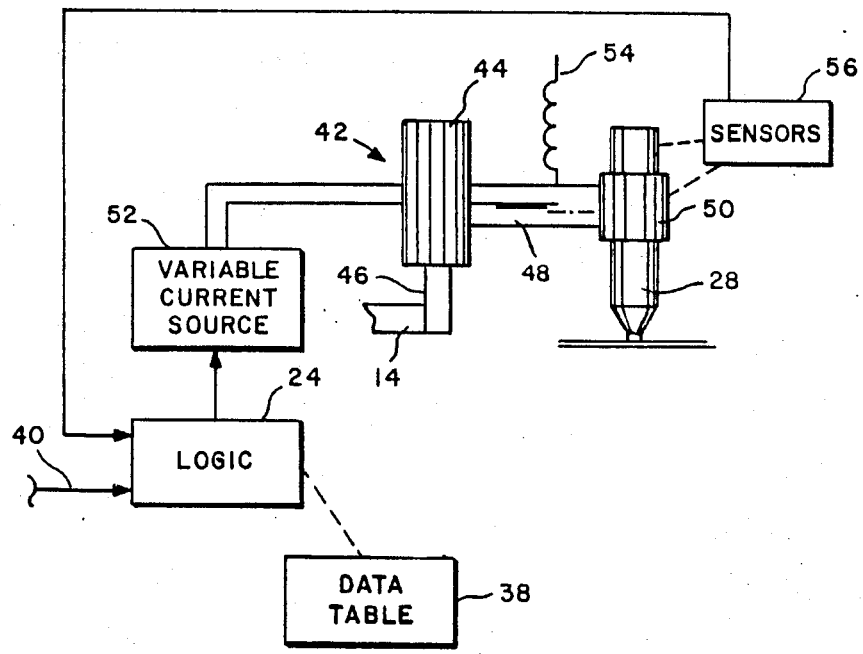
FIG. 2 is a combined simplified drawing and associated control system associated with the pen holder of the turret assembly as wherein the present invention is employed.

Turning now to FIG. 2, a pen holder and associated control system, generally indicated as 42, as used in combination with the turret 26 of FIG. 1 are shown. System 42 includes a linear electromagnetic coil 44 mounted for vertical movement on an armature 46 carried by the pen carriage 14. The coil 44 is driven by variable current source 52 under the control of logic 24 and carries a pen holder 48 having a releasable gripping means 50 adapted to cooperated with the gripping means 30 on the turret 26. Additional sensors 56 are connected to logic 24 for providing information about the pen type and the positioning of the pen holder 48.

Turning now to FIGS. 3–6, the basic operation of the turret assembly 26 and pen holder assembly 42 are shown in simplified form. While the operation of the turret head and pen holder assemblies will be described hereinafter in moderate detail for purposes of understanding the control system and related apparatus of the present invention, reference should be made to the above-described co-pending application of Charles Gunderson for an in-depth description of this apparatus. Both the turret 26 and pen holder 42 are mounted to a base 58 which forms part of the pen carriage 14. The stepping motor 60 is mounted to the base 58 and has a vertical shaft 62 upon which a spindle 64 is mounted for rotation by the stepping motor 60. A turret 66 is, in turn, removeably mounted onto the spindle 64 for rotation in combination therewith by the stepping motor 60. Since the turret 66 is removeable and replaceable, a number of turrets 66 can be maintained, each having different types of writing devices mounted therein whereby to, for example, change from felt pens to liquid ink pens. In this manner, the turrets 66 can be exchanged in total rather than individually replacing all the pens 28 in the gripping means 30 of a single turret 66.

Figure 3:
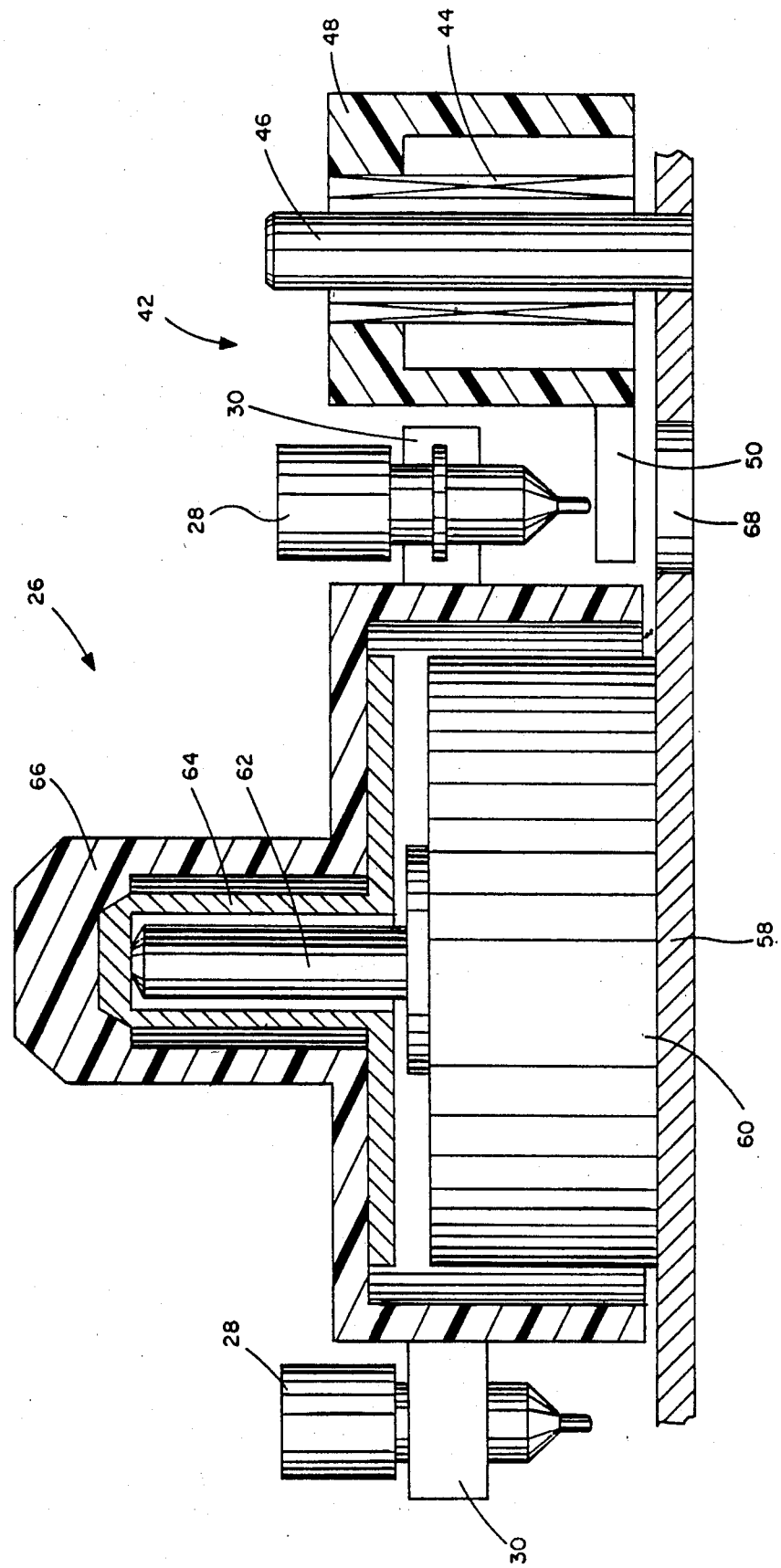
FIG. 3 is a cutaway side elevation of a simplified representation of the turret assembly where the present invention is employed.
Figure 4:
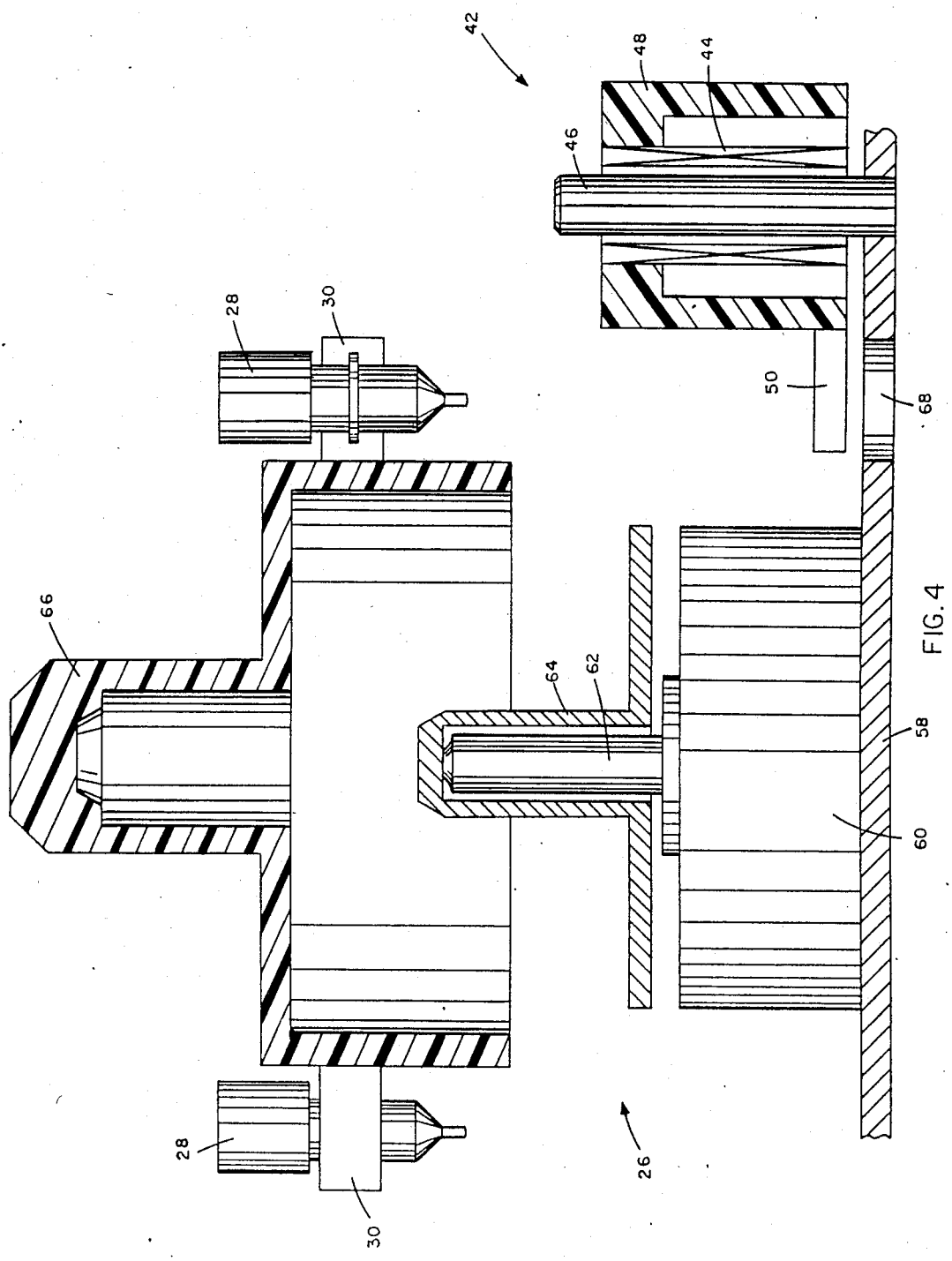
FIG. 4 shows the manner in which the turret of the apparatus of FIG. 3 can be removed.
Figure 5:
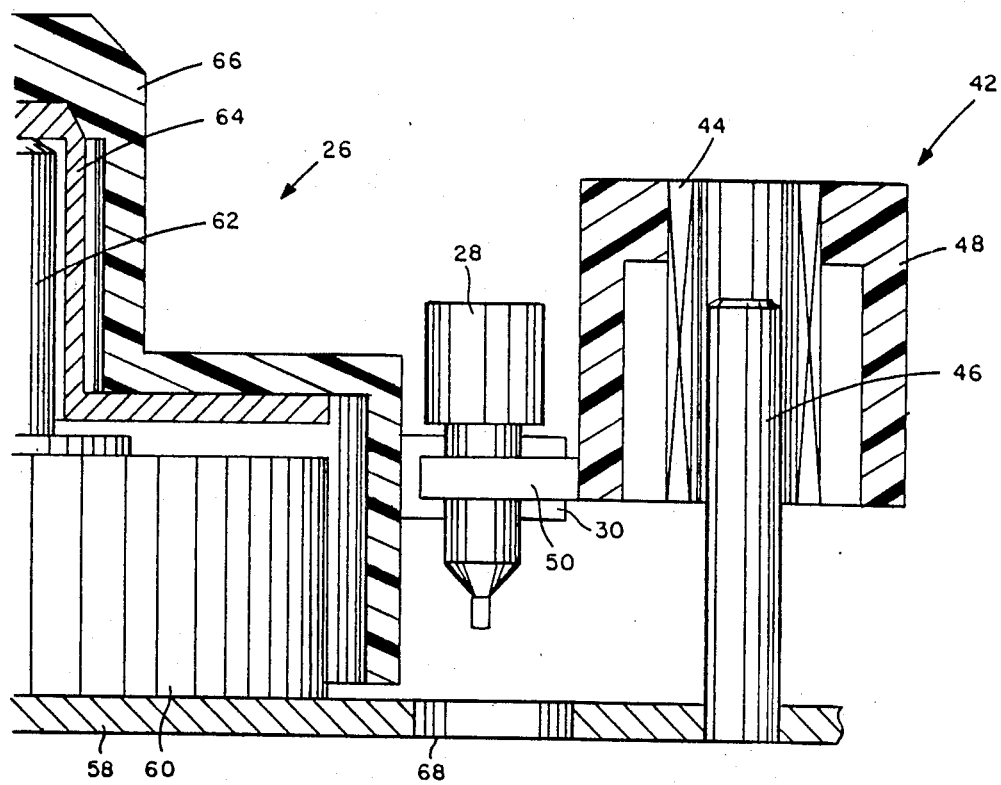
FIG. 5 shows the pen holder of the apparatus of FIG. 3 in its raised and pen exchanging position.
Figure 6:
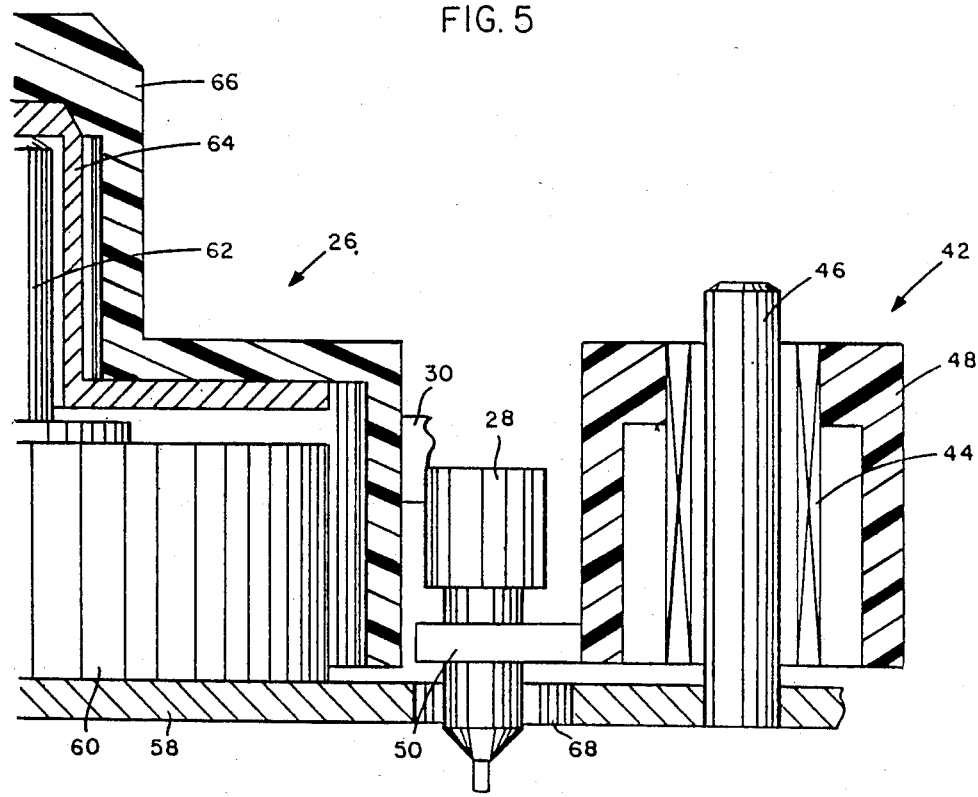
FIG. 6 shows the apparatus of FIG. 3 with the pen holder in its lowered or writing position.

To effect a pen pickup and use, the pen holder 48 is lowered to the position of FIG. 3 wherein it can be seen that its releasable gripping means 50 will pass below pens 28 as the turret 66 is revolved to put the desired pen 28 in position adjacent the pen holder 48. At that time, the pen holder 48 is raised to the position of FIG. 5 and the turret 66 rotated to move the pen 28 into contact with the gripping means 50 causing a transfer of the pen 28 from the gripping means 30 to the gripping means 50. The turret 66 is then rotated in the opposite direction a sufficient distance to allow clearance between the pen 28 and adjacent ones of the gripping means 30 disposed peripherally around the turret 66. The pen holder 48 is then lowered back to the position of FIG. 3 carrying the pen 28 with it. The tip of the pen 28 passes through a hole 68 provided in the base 58 to contact the writing medium. The pen 28 is transferred back to the turret 66 by reversing the above-described procedure.

Figure 7A:
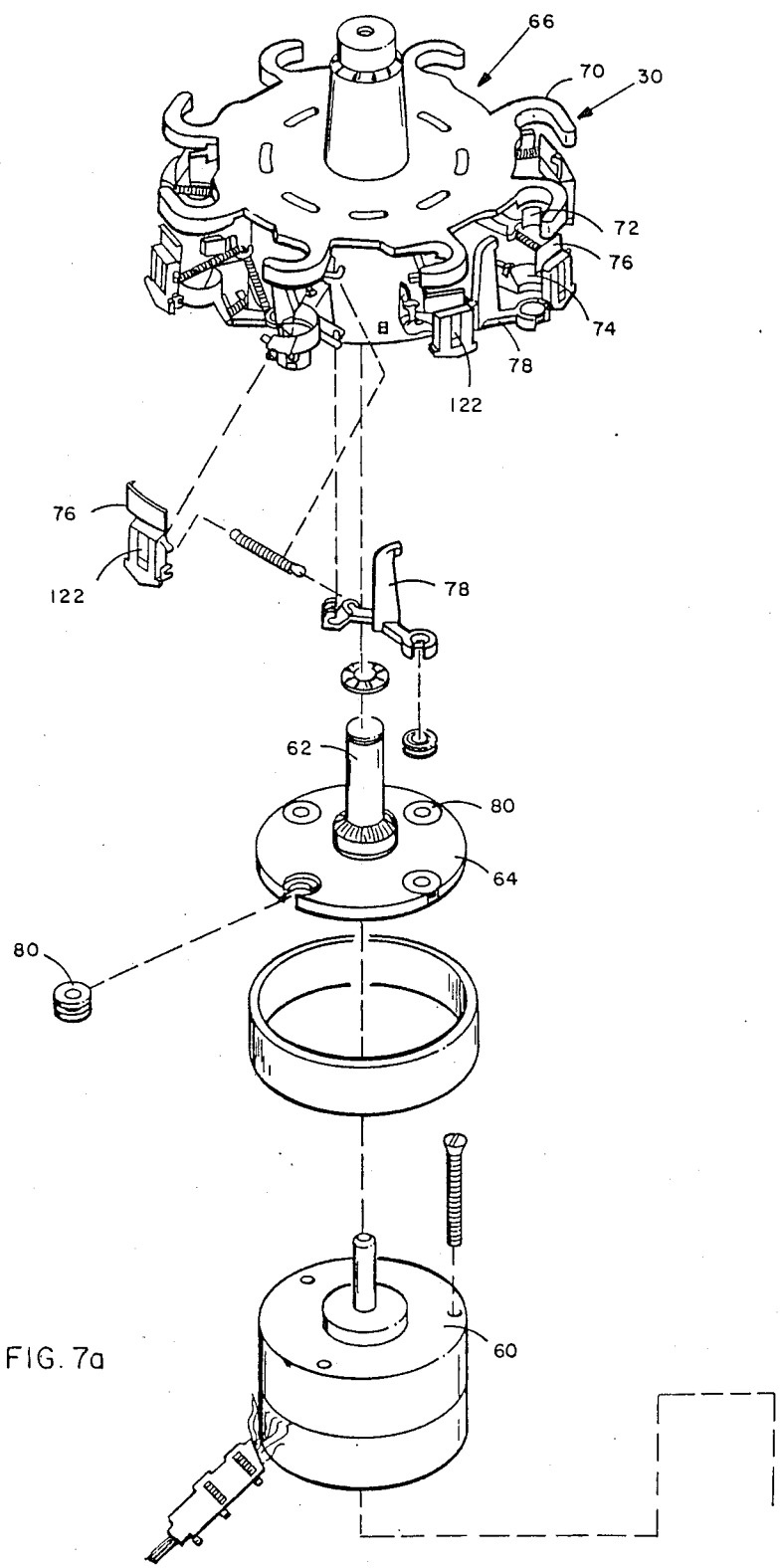
FIG. 7 (comprising two sheets labeled 7a and 7b) is an exploded view of the turret head assembly as wherein the present invention is incorporated showing the actual sensors employed therein.
Figure 7B:
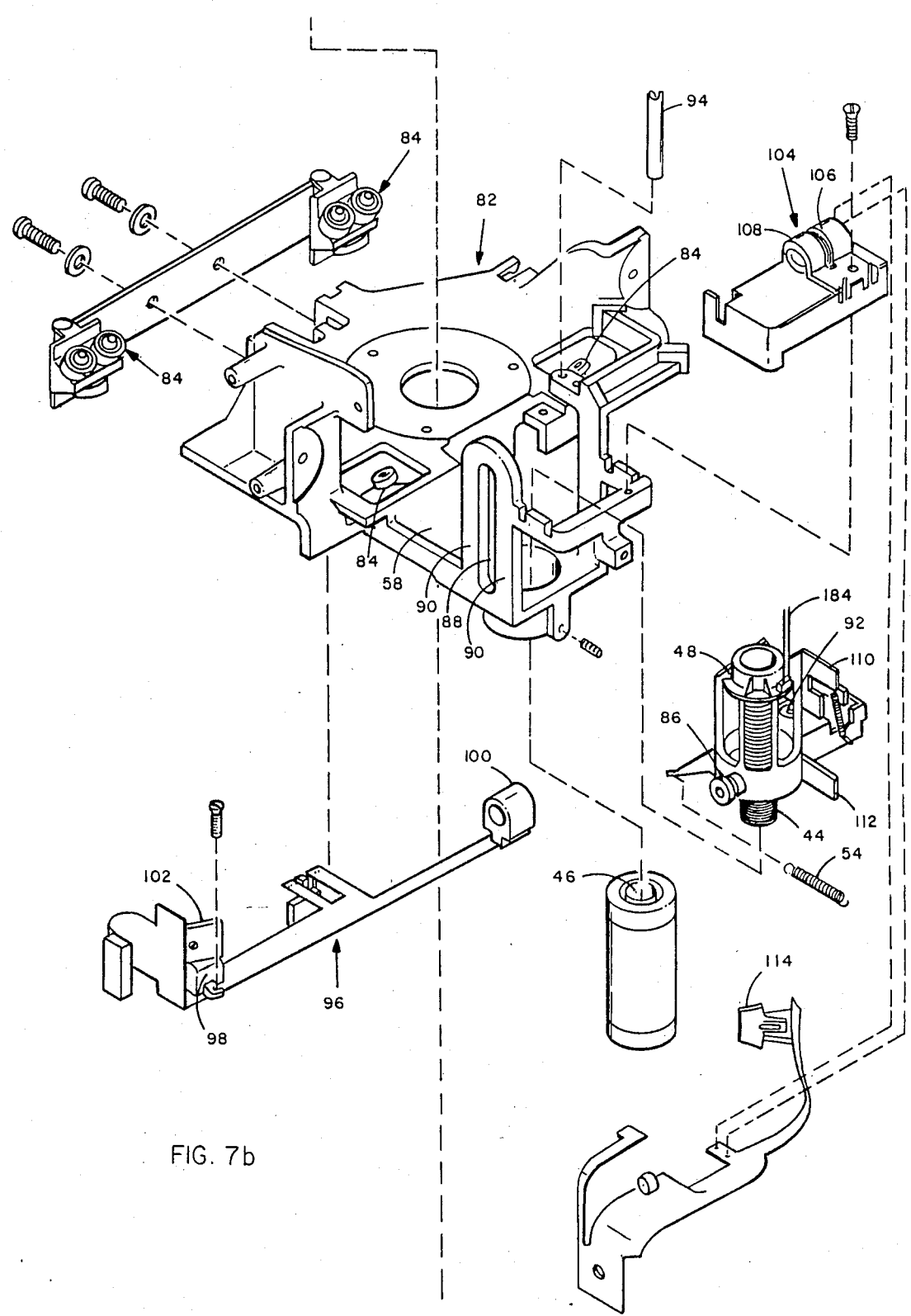

Turning now to FIG. 7, the entire turret and pen holder assemblies, along with the associated sensors, are shown in exploded view. FIG. 7 is a drawing of the actual commercial embodiment manufactured and sold by the assignee of this application and corresponds to FIG. 50 of the above-mentioned co-pending application of Charles Gunderson. The turret 66 is of injection molded plastic and comprised of three fused segments such that the gripping means 30, in each case, comprises an upper portion 70, a middle portion 72 and a lower portion 74 which carries a gripping finger 76 positioned for movement relative to the middle portion 72. Each of the eight positions of gripping means 30 also includes an automatic pen capping arm 78 which automatically caps and uncaps the tip of the associated pen as the pen is extracted and replaced. The pen motor is again indicated as 60 and the spindle as 64. It will be noted that spindle 64 includes indented members 80 which receive projections (not shown) projecting downward from the top of the inside of upper portion 70 of turret 66 to firmly engage the turret 66 for rotation in combination with the spindle 64. The base 58, as mentioned, is incorporated into the pen carriage 82 which moves on guide rollers 84. Pen holder 48, as can be seen, is also of plastic and formed as a generally cylindrical cage having the linear coil 44 disposed concentrically therewithin. Pen holder 48 has a roller bearing 86 mounted to one side which moves within a slot 88 defined by the two members 90 extending upward from the base 58. A second cylindrical roller bearing 92 in the pen holder 48 has a shaft 94 extending vertically from base 58 passing therethrough whereby between the bearings 86, 92 the pen holder 48 is guided for precise up and down motion between raised and lowered positions.

Several other features are incorporated within the assembly shown in FIG. 7 of particular importance to the present invention. These will be described briefly at this point and then in greater detail hereinafter. A first sensor assembly 96 is used to detect the presence and absence of the turret 66 from proper mounting on the spindle 64. Sensor assembly 96 comprises a light source 98 producing a small column of light directed towards a light detector 100. A second, unitary, sensor 102 incorporating both a light source and light detector is employed to detect when the turret 66 is at a home position. A third sensor assembly 104 comprising a light source 106 and light detector 108 is used in conjunction with upper and lower tabs 110, 112, respectively, projecting from the pen holder 48 to indicate the proximity of the pen holder 48 to raised and lowered positions. Lastly, a fourth, unitary, sensor 114 is used for several purposes to be described in detail shortly. First, it detects the presence or absence of a pen at the various positions of the turret 66. Second, it detects the presence or absence of a pen in the gripping means 50 whereby the success of a pen exchange can be verified, and finally, it scans the pens 28 as they are lowered by the pen holder 48 to generate a pen type signal passed to the logic to be used for various control functions.

Figure 8:
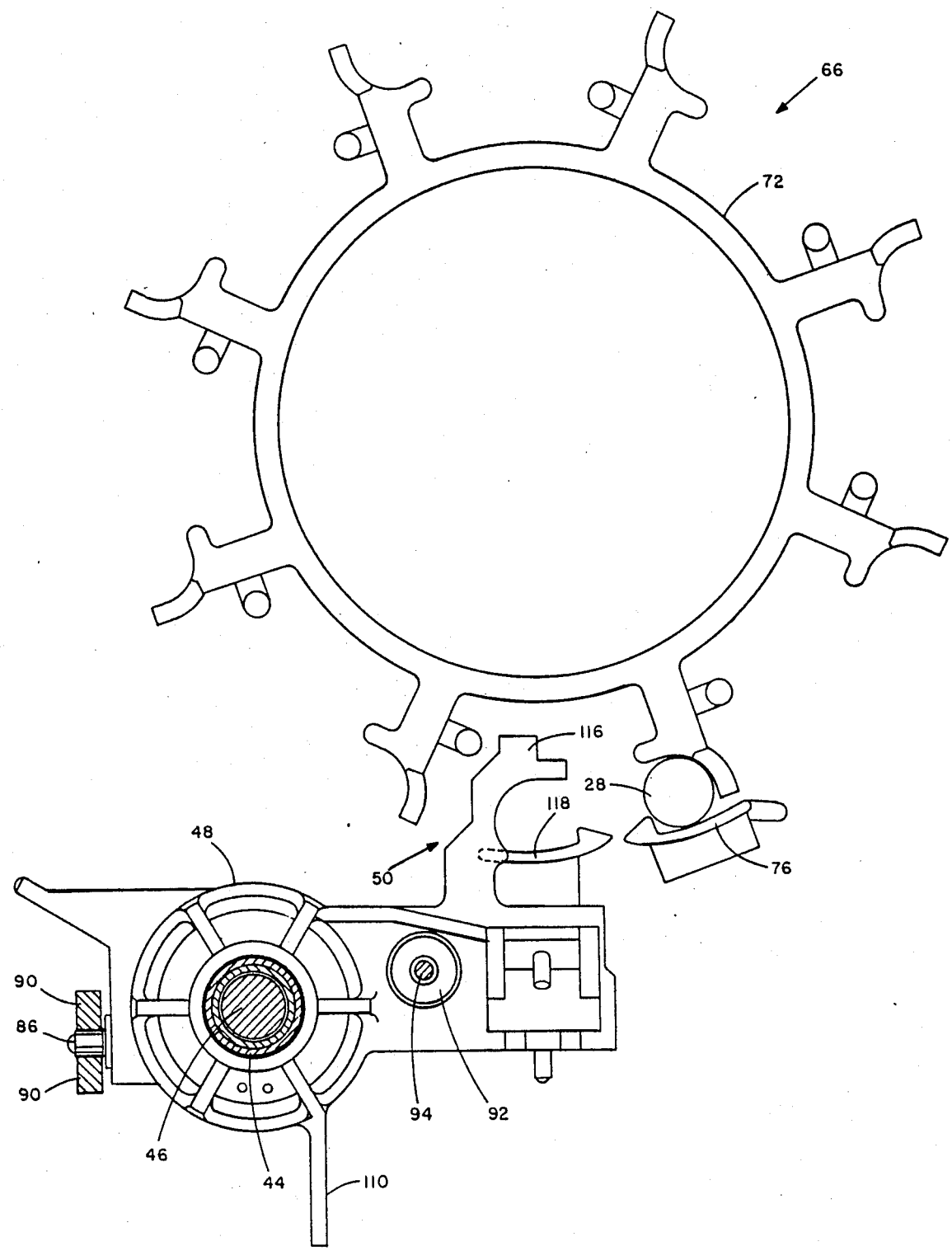
FIG. 8 is a plan view cutaway through the assembled apparatus of FIG. 7 showing a pen being held by the turret about to be exchanged to the pen holder.
Figure 9:
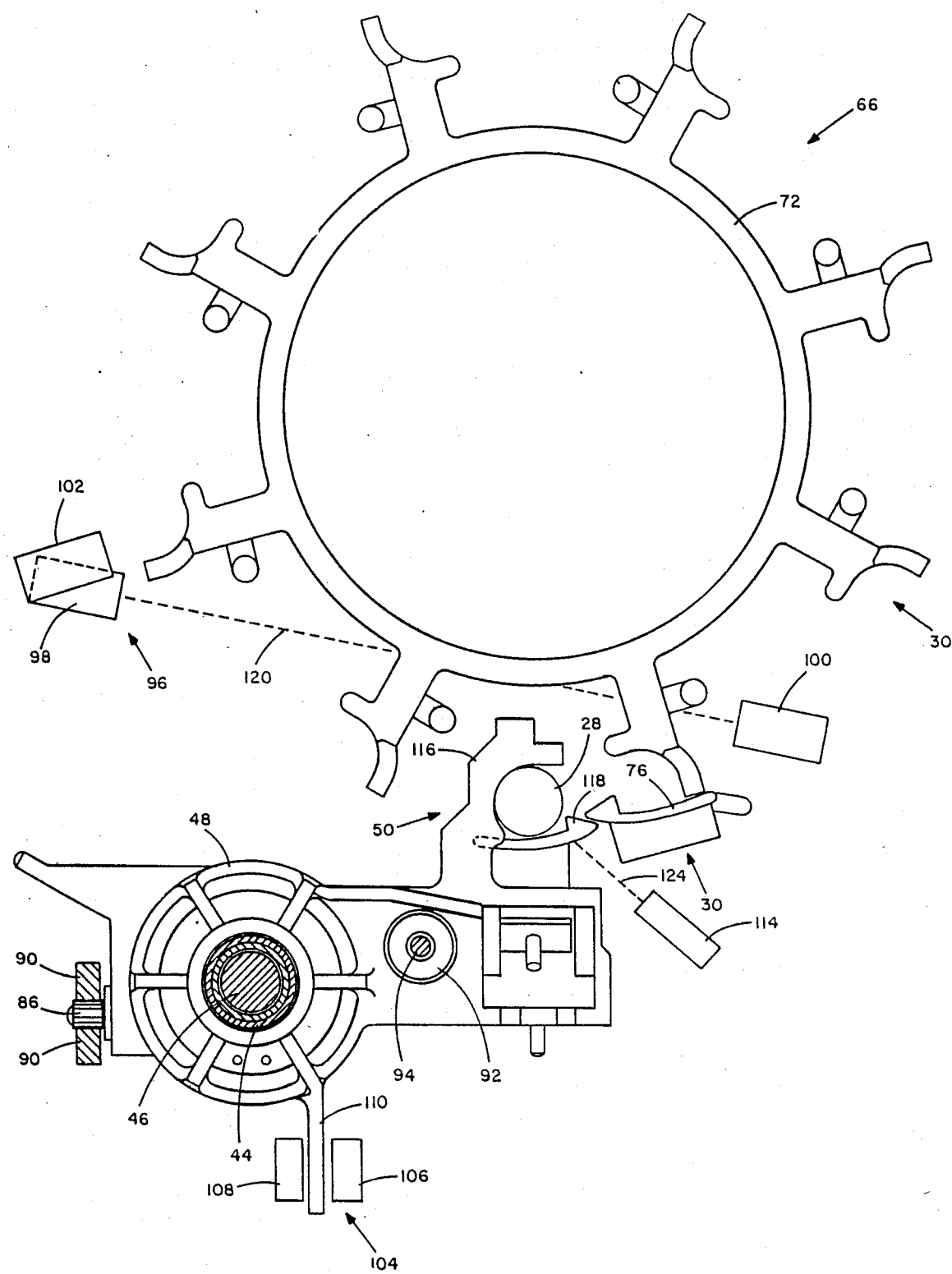
FIG. 9 shows the apparatus of FIG. 8 following a pen exchange and also shows the placement of the sensors employed in conjunction therewith for purposes of the present invention in simplified form.
Figure 15:
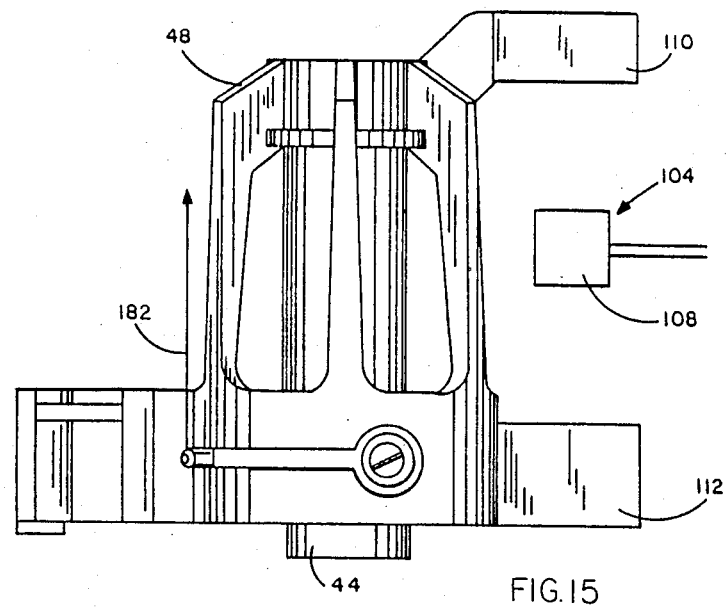
FIG. 15 is a side elevation of the pen holder of the commercial embodiment showing the placement of the sensor relative to tabs provided for indicating degree of approximity to raised and lowered positions.
Figure 16:
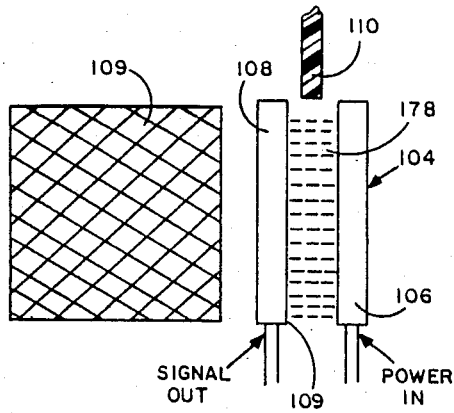
FIG. 16 shows the relationship of the sensor and tabs of FIG. 15 when the tab is totally out of a position disposed between the sides of the sensor.
Figure 17:
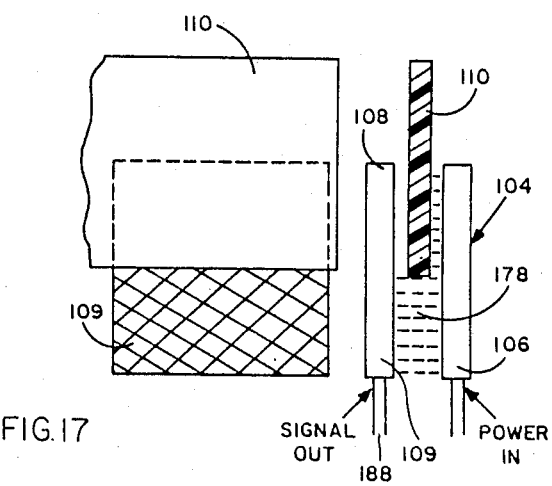
FIG. 17 depicts the relationship of the tabs and sensor from FIG. 15 in a partially obstructed position.

Turning now to FIGS. 8 and 9, the assembled apparatus of FIG. 7 is shown generally in the plane of middle portion 72 (where the pen exchange operation takes place). For simplicity, superfluous components have been removed and the various sensors are shown in simplified form so that the operation can be better understood. The pen holder 48 has its releasable gripping means 50 in the form of a gripping arm 116 having a gripping finger 118 pivotally mounted thereon. Fingers 76, 118, while unique in construction, operate in a manner well known in the art such that when brought together, a pen 28 held by one of the fingers 76, 118 will be transferred to the other. All this is described in detail in the above-mentioned co-pending Gunderson application and, therefore, will be described in no greater detail at this time.

With reference to FIG. 9, the first sensor assembly 96 is positioned such that the beam of light 120 between the light source 98 and the light detector 100 follows the dotted path indicated as 120, passing through the side of the turret 66. With a turret 66 in place on the spindle 64, the light beam 120 is interrupted and light does not reach detector 100. Detector 100 is connected to logic 24 and, therefore, logic 24 knows that a turret is in place. When light 120 strikes detector 100, logic 24 is informed by the generated signal from detector 100 that the turret 66 is absent. Second sensor 102 (also connected with its output to logic 24) is directed towards the end of the gripping fingers 76 in the area indicated as 122 in FIG. 7a. One of the gripping fingers 76 has a piece of reflective tape (not shown) disposed within area 122. When that gripping finger 76 passes in front of sensor 102, a light beam (not shown) emerging therefrom is reflected back in to the sensor 102, giving the logic 24 a signal that the turret 66 is positioned at a "home" position from which the stepping motor 60 can be stepped to position the turret 66 with any of the thus referenced addressed gripping means 30 in position adjacent the pen holder 48 to effect a transfer of the pen 28 to the gripping arm 116 thereof.

The third sensor assembly 104 is positioned with the light source 106 and light detector 108 on either side of the path of the tabs 110, 112 as the pen holder 48 moves up and down between its raised and lowered positions. A more detailed discussion of the operation of third sensor assembly 104 and the control system employed therewith will be undertaken shortly.

First, however, fourth sensor 114 will be discussed in greater detail. As can be seen in FIG. 9, with a pen 28 within gripping arm 116, the light beam 124 of sensor 114 is directed onto the pen 28 and, as will be seen, serves two purposes. First, it detects the presence of a pen and second, it scans the pen as the pen is lowered. With no pen in gripping arm 116, light 124 can pass past gripping arm 116 to strike a corresponding surface on pens 28 within the various gripping means 30 of turret 66 as turret 66 is revolved. In this manner, the logic is able to rotate the turret 66 and scan the positions thereof to determine the absence or presence of pens within the turret at initialization time. As part of the initialization procedure according to the present invention, when a turret is first installed, the "home" position is first located. Knowing the home position and the number of pulses of the motor 60 between positions (i.e., the spacing between gripping means 30) the turret 66 can be rotated 360° and sensor 114 used to detect and log the presence or absence of a pen for use in each of the thus addressable positions.

The writing devices used in plotting can be of various types as shown in FIG. 10. Some of the familiar types include the ball point as shown in FIG. 10a, the felt tip as shown in FIG. 10b, the liquid ink as shown in FIG. 10c, and the graphite as shown in FIG. 10d. In a ball point pen such as that indicated generally as 126 in FIG. 10a, a hollow pen body 128 tapers to a writing point at 130. The writing point 130 contains a rolling ball 132 and the body 128 is filled with a thick, viscous ink 134. When the pen 126 is lowered to its writing position, the ball 132 is placed in contact with the paper (or other writing medium) and as the plot takes place, the ball 132 is rolled over the paper causing ink 134 to be rolled out of the body 128 onto the ball 132 and from thence to the paper.

In a felt tip type pen such as that indicated as 136 in FIG. 10b, the rolling ball 132 is replaced with a wick tip 138 and the thick ink 134 is replaced with a thinner ink 140 adapted to flow through the tip 138 and to be transferred to the paper as the tip 138 is moved along the paper. Early felt pens 136 had their tip 138 of felt material from whence the generic name is derived. The felt pens employing felt tips were prone to rapid tip wear and broad lines. As a consequence, bamboo was used later and, more recently, artifical materials having the desired wicking action but longer wearing life have been substituted.

The liquid ink type pen is generally indicated as 142 in FIG. 1c. This is the type of pen for which the turret assembly as wherein the present invention is employed was primarily devised. Because of their construction and nature of operation, these pens require special handling to prevent misoperation due to pen tip drying and improper pen pressures. In the liquid ink type pen 142, the writing point 130 comprises a thin tube 144 in which a longitudinally moveable stem 146 is disposed connected to a sealing ball 148 at the inner end. The construction is generally of the type employed in mechanical drawing instruments and, accordingly, India ink 150 is disposed within the hollow body 128. When the tip of the tube 144 is placed in contact with the paper, the stem 146 is pushed into the tube 144, pushing the ball 148 out of sealed engagement with the inner end of the tube 144 and allowing the India ink 150 to move therethrough by capillary action.

While not as popular, a graphite writing instrument such as that generally indicated as 152 in FIG. 10d, is sometimes used. Therein, the writing point 130 of the hollow body 128 is fitted with releasable gripping jaws 154 used to grip a piece of drawing lead 156.

Each of the above-described devices, as well as others which can be used (which were not described) requires a different pressure holding the writing portion of point 130 against the paper or other media to effect an optimum line to be drawn thereby. Insufficient pressure can cause late starting and/or skipping as well as generally poor line quality. Excess pressure can lead to smudging, paper tearing and tip breakage or deformation. Moreover, in units such as those employing turret heads, the various pen types can be mixed during a single plot such that pre-programming of the device is impractical; that is, as the plotter changes "pens" throughout the plotting procedure, the value of the optimum pressure on the pen is constantly changing.

Turning now to FIGS. 11-14, the pen and its associated sensor as employed in the preferred embodiment of the present invention are shown. The pen 28' comprises a cylindrical body 128 as described above with the writing tip 130 at one end. The writing tip 130 is usually at the bottom end so the opposite end will be referred to as the top end. The body 128 contains one or more peripheral ridges 158 used to cooperate with matching grooves on the various gripping means to maintain the longitudinal stability of the pen 28'. This much of the pen 28' is well known in the art and, as such, forms no part of the present invention. According to the present invention, however, the top end of the body 128 is fitted with a cylindrical collar portion 160 having a reflective surface 162 thereon. In the preferred embodiment, reflective surface 162 is in the form of a reflective metal foil disposed on the outer surface of the collar. Cylindrical collar 160 can be molded as part of the plastic body 128 or, as shown in FIG. 12, can be a detachable collar which is slipped over the upper end of the body 128. A preferred embodiment of pen 28' as incorporated in the commercial plotter of the assignee is shown in co-pending application Ser. No. 633,172, now U.S. Pat. No. 4,540,933 of the applicants herein filed on even date herewith and titled PLOTTER PEN, which is also assigned to the assignee of this application.

Sensor 114 includes a light source 164 and a light detector 166. Sensors such as that indicated as 114 have been obtained by applicant for use in the commercial embodiment from Sensor Technology, Inc. Sensor 114 is disposed as shown and previously described with respect to FIG. 9 such that a light beam 168 from it strikes a pre-established portion adjacent the bottom of the cylindrical collar 160 as shown in FIG. 11. Light 168 from source 164 strikes the reflective surface 162 at a point and is reflected at 170 into the light detector 166 connected by lines 172 to the logic 24. Each collar 160 has a reflective surface 162 for a fixed portion adjacent the bottom of collar 160 for the purpose of detecting the presence or absence of a pen 28' at any location.

For further purposes of the present invention, above the lower portion (which must always be reflective for purposes of pen presence identification) the reflective surface 162 of the collar 160 is provided with coded bands 174 comprising circumferential non-reflective strips. As the pen 28' held in gripping arm 116 is lowered by pen holder 48 between the raised and lowered positions, the collar 160 is passed vertically in front of the sensor 114 in the direction of arrow 176. As can be seen in FIGS. 13 and 14, as the light 168 is caused to strike a band 174, no reflective light 170 is produced whereas, as shown in FIG. 14, when the next portion of the reflective surface 162 is reached, reflective light 170 is once again produced. By employing different numbers of bands 174 with each type of pen 28' employed, a pulsed signal can be sent by sensor 114 to the logic 24 as the pen 28' is lowered from which pre-set data in data table 38 can be indexed to provide an appropriate pressure indication for the optimum pressure to be applied downward on the pen 28' to effect optimum writing.

Figure 18:
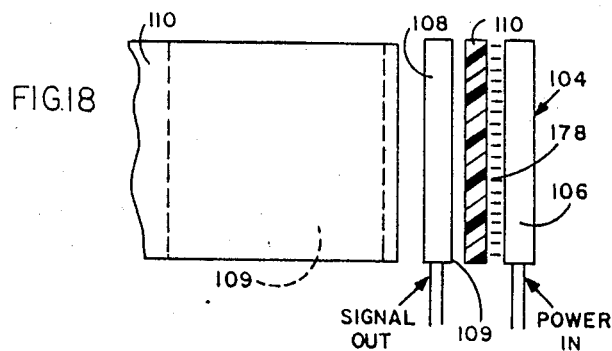
FIG. 18 shows the tabs and sensors from FIG. 15 in a totally obstructed position.

Turning now to FIGS. 15–18, the operation of sensor 104 will be discussed in greater detail. As previously mentioned, sensor 104 comprises a light source 106 and a light detector 108. Sensor 104 is also obtained from Sensor Technology, Inc. and has the characteristic that a broad pattern of light 178 emerges from the light source 106 to impinge across the total area of sensitivity 109 of the detector 108 as indicated by the cross-hatched representation in FIG. 16. Also, as previously mentioned, the detector 104 is disposed relative to the tabs 110, 112 on pen holder 48 such that the tabs 110, 112 pass between the light source 106 and the light detector 108. The downward movement of the pen holder 48 is the most critical and, therefore, will be described in greatest detail. The upper tab 110 is used to control the downward movement of the pen holder and a pen 28' gripped therein. A spring 54 is connected to projection 180 to cause an upward biasing force against pen holder 48 in the direction of arrow 182. Coil 44 is a linear electromagnetic coil connected by wires 184 to the variable current source 52. Thus, positive current flow raises the coil 44 above its no current position to its full up position while negative current flow lowers the coil (and pen holder 48) to the writing position. The performance characteristics of the sensor 104 relative to movement of the pen holder 48 can be seen with respect to FIGS. 16–18 taken in conjunction with the graph of FIG. 19. With no tab 110, 112 disposed between the light source 106 and the detector 108 as in FIG. 16, a maximum signal out is achieved. As the tab 110, 112 moves between the light source 116 and the detector 108, a portion of the light 186 is blocked; that is, either of the tabs 110, 112 moving between the light source 106 and the surface 109 of detector 108 acts like a window shade as to that portion of the light 186 which it intercepts. Thus, the signal out is proportionately diminished. Finally, as shown in FIG. 18, with either tab 110, 112 disposed totally between the light source and light detector 108, there is no signal out.

Figure 19:
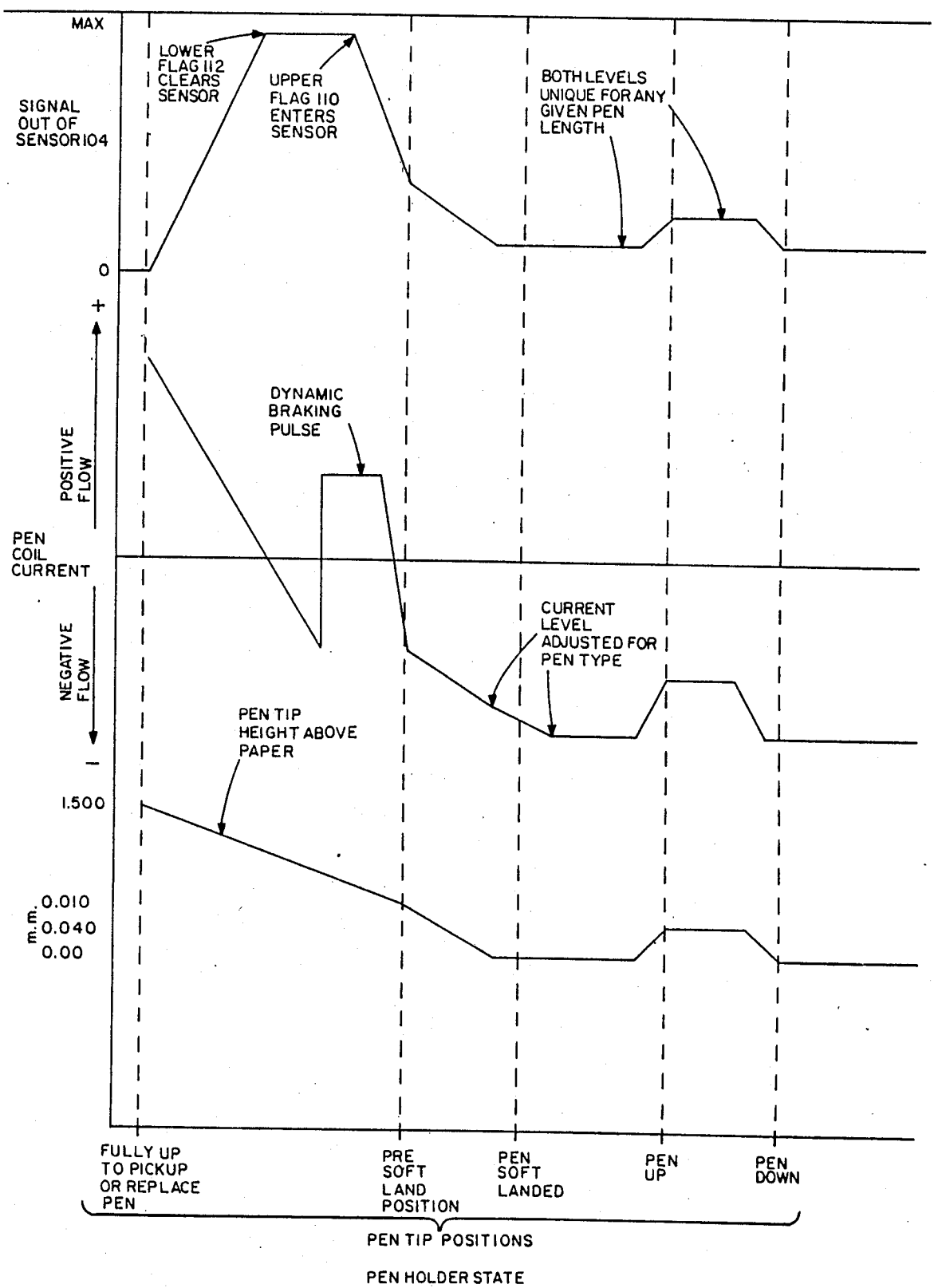
FIG. 19 is a multiple graph showing the relationship of the various elements involved in the pen holder state.

Assuming that the pen holder was in its totally raised position (i.e., positive current to coil 44), the initial condition shown in FIG. 19 would be in existence; that is, no signal out, positive current in, and the pen holder in its maximum up position. As the positive current to the pen holder is decreased and then reversed to negative current, the coil 44 pulls the pen holder 48 down linearly against the force 182 of spring 54 and the lower tab 112 is moved downward from between the light source 106 and detector 108 of sensor 104 causing an increase in the signal until the point when the maximum signal out is achieved. During that portion of travel when neither tab 110, 112 is disposed between the elements of the sensor 104, the maximum signal output is maintained. As the pen holder 48 approaches its downward position, upper tab 110, which controls the downward position, begins to be interposed between the elements of the sensor 104 beginning from the top and working downward, causing the signal output to decrease. As the negative current continues to increase, the pen holder 48 moves further downward, causing a corresponding decrease in the signal out until a pre-soft land position is achieved. From there, the pen is further lowered until the pen tip touches the media. Thereafter, a further increase in the current to adjust for proper pen pressure causes no further downward movement of the pen holder and, therefore, no further decrease in the signal out from detector 108. The output from the sensor 104 with the pen fully down is thereafter used as a reference voltage for that pen. To raise that pen to the pen up position, the coil is raised until the output from the sensor 104 is increased a fixed amount, i.e., by allowing more light to strike the surface 109 of the cell as tab 110 is withdrawn. Because the output of the sensor 104 changes linearly, the pen up position will always be the same height above the paper regardless of the pen length. As a consequence, variations in pen length are accommodated easily and automatically. Thereafter, the pen can be lowered to contact the paper and can be placed under precise pressure loading by variations in the current level from this established "pen up" position.

Figure 20:
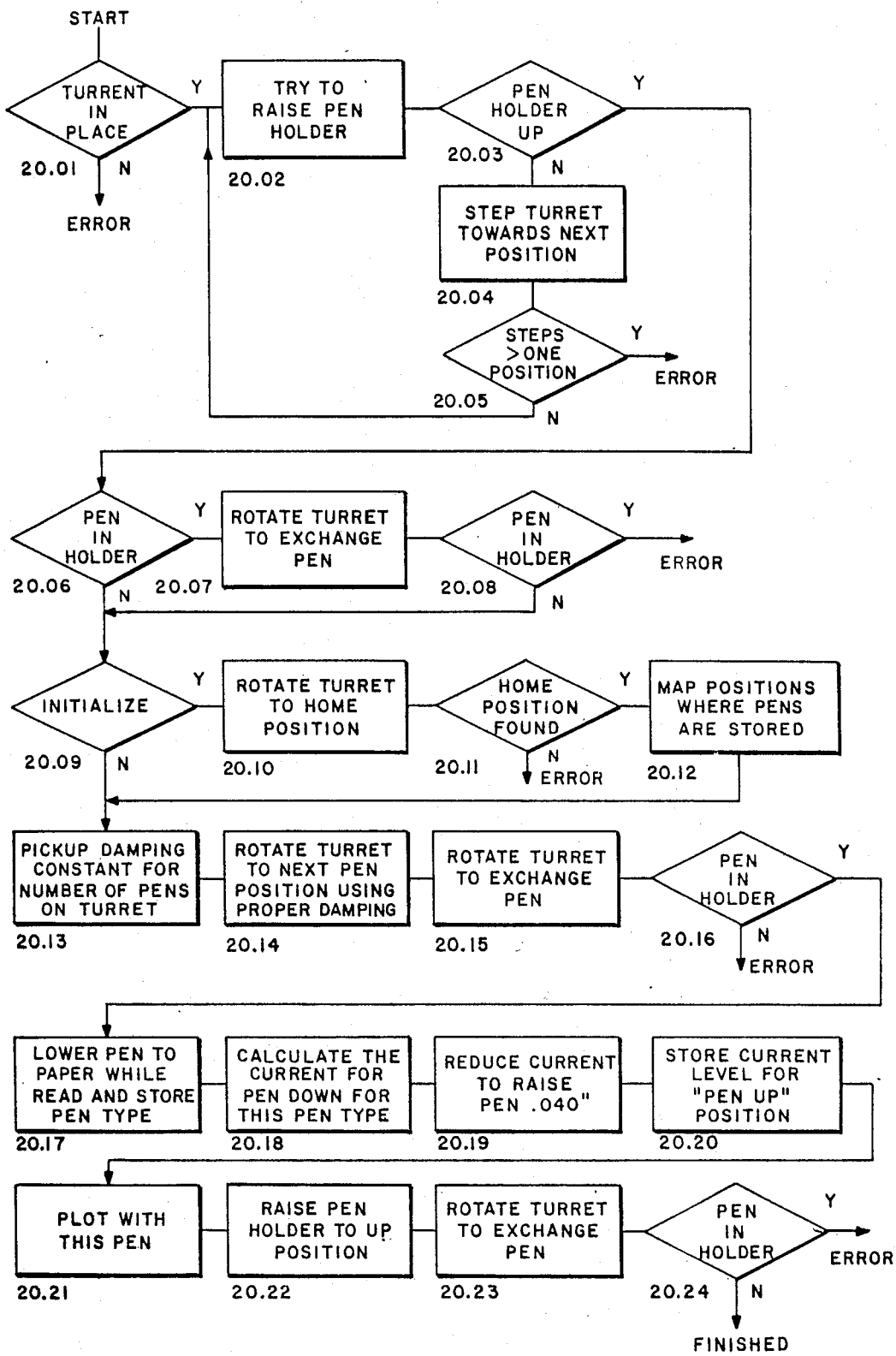
FIG. 20 is a block diagram of logic employed in the system of the present invention to assure failsafe and optimum operation.

Turning now to FIG. 20, logic incorporated within the logic 24 to accomplish the objectives of the present invention will be discussed in detail. The logic of FIG. 20 is that associated with a beginning write sequence. At decision block 20.01, the logic first checks to see if a turret is in place; that is, if the light beam of the first sensor assembly 96 is being blocked. If there is no turret in place, an error condition exists for purposes of writing and appropriate action must be taken. If a turret is in place, the logic next proceeds to block 20.02 where it attempts to raise the pen holder by turning off the current to coil 44. At decision block 20.03, the logic then checks to see if the pen holder is up; that is, with no current to the coil 44 if the lower tab 112 is disposed within sensor 104. This sequence is necessary since the turret may have been removed and replaced since the last write sequence and, therefore, it must be assured that the turret is in positional alignment with the gripping means 30 of the turret properly aligned with the gripping arm 116 of the pen holder. If the pen holder is not up, at block 20.04 the stepping motor is stepped one pulse towards the next position and at decision block 20.05 the logic then checks to see if the number of steps applied to the turret/stepping motor is greater than those steps required to move the turret one position. If not, the logic returns to block 20.02. If greater than one position's worth of steps has been issued, this is indicative that the turret is not turning for one or more reasons as, for example, there is a pen both in the gripping arm 116 of pen holder 14 and the adjacent gripping arm 30 of the turret 66. In any event, an error condition exists and appropriate action must be taken.

Once it is found that the pen holder is up, at decision block 20.06 the logic next checks to see if there is a pen in the holder; that is, if sensor 114 is reflecting light from the lower portion of the reflective strip of a collar of a pen in the gripping arm 116. If there is, at block 20.07 the logic next rotates the turret in an exchanging motion in an attempt to transfer the pen from the holder to the turret. At decision block 20.08, the logic next checks to see if a pen is still in the holder. If it is, an error conditions exists as, for example, the pen exchange mechanism failed to work or a second pen was already in the gripping arm 30 of the turret at that position. In either case, appropriate action must be taken before further writing can take place.

Once it is determined that there is no pen in the holder, the condition is one wherein the pen holder is ready to accept a pen and the turret is in positional alignment. The logic next checks at decision block 20.09 as to whether an initialization condition is present; that is, whether this is a first time sequence with this turret or merely a continuation. If initialization is required, at block 20.10 the logic first rotates the turret to its "home" position and then at decision block 20.11 it checks to see if the home position was found. If not, an error condition exists and must be dealt with. If the home position is found, the logic at block 20.12 next maps the positions where the pens are stored and saves this data in an appropriate table for later reference. This is easily accomplished by rotating the turret past the sensor 114 which will reflect a light beam from each pen disposed in a position on the turret and not reflect where no pen is present as previously discussed. Following initialization or when no initialization is required, at block 20.13 the logic uses the number of pens counted in block 20.12 as an index into a table to pick up an appropriate damping constant to use with the turret in rotating it with the stepping motor. Because of the light weight of the plastic turret and the characteristics of stepping motors, a vast difference in the performance of the rotation of the turret is encountered with various numbers of pens of varying weights and, therefore, preferred and repeatable operation is accomplished by the use of variable damping constants selected based on the calculated weight of the turret as determined by the number of pens carried. Having picked up the appropriate damping constant, at block 20.14, the logic next rotates the turret to the next selected pen position using the proper damping factor as determined. In the preferred embodiment incorporated within the commercial plotter of the assignee, if there is no pen according to the map from block 20.12 in the selected position, the logic uses the next available position of a higher number in which a pen has been positioned. Those skilled in the art will recognize that alternative selection schemes can be accomplished as best suit the needs of the user. For example, an error condition could be established and the logic stopped rather than using a non-selected pen. At block 20.14, the logic next rotates the turret to exchange the pen from the turret to the pen holder at the selected position. At decision block 20.16, the logic checks to see if the exchange was successful by seeing if a pen is now in the holder as determined by sensor 114 reflecting from the lower portion of the collar. If not, once again an error condition exists and appropriate action must be implemented.

Once the pen is successfully transferred to the holder, at block 20.17, the logic lowers the pen to the paper in the manner described with respect to the graph of FIG. 19 and, simultaneously, scans the bands on the collar of the pen to determine the type coding and stores the type coding for later use. At block 20.18, using the type index for the pen as an index and obtaining the required information as previously stored in the data table 24 by pen types, the logic next calculates and stores the current required to put the pen in a down position for writing under the optimum pressure for this pen type. At block 20.19, the logic next reduces the current to raise the pen 0.040 inches and then add block 20.20 stores that current level as the level required for the "pen up" position used in moving the pen between points during a write sequence. At block 20.21, the logic next follows the plot sequence with this particular pen, raising and lowering the pen as required during the plotting action until such time as it is required to change pens. When finished, at block 20.22, the logic next raises the pen holder to the up position and at block 20.23, rotates the turret to exchange the pen from the pen holder to the turret. At decision block 20.24, the logic checks to see if the pen is still in the holder. If it is, the exchange was unsuccessful and an error condition exists. If not, the exchange was successful and the logic sequence is finished.

Particularly with liquid ink pens, it may be desirable as an optional addition to the logic of FIG. 20 to include a time check within the broad scope of block 20.21 wherein, for example, after 30 seconds of the pen remaining in the "pen up" position (non-writing and exposed to drying), the logic moves on to block 20.22 to cause the pen to be placed back in the turret and capped following which the logic of FIG. 20 must be reinstituted to place the pen in its writing position for continued plotting.

Wherefore, having thus described our invention, we claim:

1. In a graphics plotter having a turret for releasably holding a plurality of writing devices and a pen holder for exchangeably obtaining writing devices from the turret where the turret and holder are moved in combination on a pen carriage, said turret is rotated by a logic controlled stepping motor, the pen holder is raised and lowered by a logic controlled electromagnetic coil, and the pen carriage is moved by a logic controlled drive motor, the improvement comprising:

(a) first sensor means for detecting the presence and absence of a turret on the pen carriage and for producing a signal indicating same;

(b) second sensor means for detecting when the turret is in a home position and for producing a signal indicating same;

(c) third sensor means for detecting the degree of proximity of the pen holder to raised and lowered positions and for producing a signal indicating same;

(d) fourth sensor means for detecting the presence or absence of writing means at addressable positions of the turret relative to said home position, for detecting the presence or absence of writing means in the pen holder, for determining the type of writing device in the pen holder, and for producing signals indicating same; and, (e) variable current source means connected between the logic and the electromagnetic coil for controlling the position of the pen holder and the downward pressure on a writing device in the holder.

2. The improvement of claim 1 wherein the logic includes logic to accomplish the steps of:

(a) checking to see if a turret is in operable position and performing an error routine if it is not;

(b) trying to raise the pen holder;

(c) checking to see if the pen holder is up and proceeding to step (f) if it is;

(d) stepping the turret towards the next position;

(e) checking to see if the turret has been stepped greater than the number of steps in one position and proceeding to an error routine if it has;

(f) checking to see if a pen is in the holder and proceeding to step (i) if is not;

(g) rotating the turret in a pen exchange motion to move the pen from the holder to the turret;

(h) checking to see if the pen is still in the holder and proceeding to an error routine if it is;

(i) checking to see if the turret control routine is to be initialized and proceeding to step (m) if is not;

(j) rotating the turret to its home position;

(k) checking to see if the home position was found and proceeding to an error routine if it was not;

(l) mapping the positions on the turret where pens are stored and saving the data for later use;

(m) picking up from a table a damping constant for the number of pens on the turret stored in step (l);

(n) rotating the turret to the next selected pen position using the proper damping constant;

(o) rotating the turret in an exchange motion to move the pen from the turret to the pen holder;

(p) checking to see if there is a pen in the holder and proceeding to an error routine if there is not;

(q) lowering the pen to a point of contact with the paper while simultaneously storing and reading the pen type from the indicia thereof on the pen;

(r) calculating and storing the current for the "pen down" position at an optimum pressure for this pen type;

(s) reducing the current in the coil to raise the pen to a pre-established pen up distance from the paper;

(t) storing the current level for the "pen up" position;

(u) plotting with the pen;

(v) raising the pen holder to its full up position;

(w) rotating the turret in a pen exchange motion to move the pen from the holder to the turret;

(x) checking to see if a pen is in the holder and proceeding to an error routine if there is, otherwise finishing this sequence.

3. The improvement of claim 2 wherein the logic also includes the logic within step (u) thereof of:

(u1) checking to see if the pen has remained in its "pen up" position for longer than a pre-established time and moving immediately to step (v) if it has, otherwise continuing with the plotting of step (u).

4. The improvement of claim 1 wherein:

(f) each writing device has a reflective surface disposed circumferentially at a pre-established position; and (g) the fourth sensor means detects a beam of light directed at said pre-established position of a writing device in the pen holder, for sending said beam when reflected from said reflective surface, and for sending a signal to the logic indicating the absence and presence of a writing device in the pen holder.

5. The improvement of claim 4 wherein:

said fourth sensor means is also disposed for reflecting said beam of light towards said turret when there is no writing device in the pen holder and for reflecting and detecting said beam from writing devices in the turret as the turret is rotated whereby said signal to said logic indicates the absence and the presence of writing devices being held by the turret.

6. The improvement of claim 4 wherein additionally:

(h) said reflective surface includes non-reflective bands disposed circumferentially and indicating the type of writing device; and (i) said fourth sensor means further comprises means for sending a continuous signal to the logic as the writing device is lowered past said fourth sensor means when the pen holder is lowered whereby said signal to the logic is a pulsing signal indicating the type of writing device presently in the pen holder.

7. The improvement of claim 6 and additionally comprising:

(a) a variable current source connected between the logic and the electromagnetic coil whereby an adjustably variable downward pressure can be created in the pen holder and writing device being held therein whereby the pressure on the writing device can be controlled; and, (b) the logic includes logic responsive to said signal from said fourth sensor means for causing said variable current source to set the current at a level for the type device sensed which is optimum for its writing.

* * * * *